Sept. 23, 1958   R. R. JOHNSON   2,853,238
BINARY-CODED FLIP-FLOP COUNTERS
Filed Dec. 20, 1952

INVENTOR.
ROBERT ROYCE JOHNSON,
BY
Lester S. Hecht
ATTORNEY.

United States Patent Office 2,853,238
Patented Sept. 23, 1958

2,853,238

BINARY-CODED FLIP-FLOP COUNTERS

Robert Royce Johnson, Pasadena, Calif., assignor, by mesne assignments, to Hughes Aircraft Company, a corporation of Delaware Application December 20, 1952, Serial No. 327,131

12 Claims. (Cl. 235—92)

This invention relates to binary-coded flip-flop counters and, more particularly, to binary-coded flip-flop counters mechanized in accordance with a set of transformation functions requiring a minimum of gating circuits and providing an evenly-distributed load for the flip-flops.

The present invention extends the basic principles of the flip-flop counters shown in two copending U. S. patent applications. The first copending U. S. patent application, Serial No. 245,860, entitled "High-speed Flip-Flop Counter," by Eldred C. Nelson, filed September 10, 1951, discloses a binary counter wherein all flip-flops are triggered simultaneously in response to count pulses applied in parallel to a plurality of "and" circuits, one for each flip-flop. Each of the "and" circuits is controlled by voltage-state signals derived from the conduction states of each of the preceding flip-flops in the counter chain. Application Serial No. 245,860 has been assigned of record to the assignee of this application.

The counter described in the first copending application may be distinguished from prior-art binary counters in that the flip-flops are not connected in "cascade." The term cascade is utilized to indicate that each flip-flop in the counter chain is triggered by a carry pulse produced by the preceding flip-flop, as it is triggered from a 1-representing state to a 0-representating state. In the cascaded type of flip-flop counter the count pulses are applied to the first flip-flop in the chain and carry pulses are then propagated through the counter. A "settling" time must be allowed between the count pulses to permit the counter to assume a count-representing stable state before the next pulse is applied. This settling time is equal to N times the time of pulse propagation between two flip-flops, where N is the total number of flip-flops.

One of the features of the counter shown in the first application, then, is that it may be operated at approximately N times the speed of the corresponding prior-art counter; N again being the number of flip-flops.

The second copending U. S. patent application, Serial No. 327,567, now Patent No. 2,816,223, entitled "Binary-Coded, Flip-Flop Counters," by Elred C. Nelson, filed December 23, 1952, extends the principles taught in the first copending application to all binary-coded flip-flop counters, with the introduction of a novel transformation theory. Copending application Serial No. 327,567, now Patent No. 2,816,223 has also been assigned of record to the assignee of this application. According to this transformation theory, there are three basic types of transformation functions which may be utilized to define the sequence of stable states of a flip-flop. The first type of transformation function is referred to as a setting transformation function and defines the conditions for setting the flip-flop to be controlled to a 1-representing state or to a 0-representing state. The second type of transformation function is referred to as a changing transformation function and defines the conditions for changing the flip-flop to its opposite representing state i. e. from a 1-or-0 representing state to a 0-or-1 representing state. The third type of transformation function is referred to as a partial-changing transformation function and defines either the conditions for changing the associated flip-flop from a 1 to a 0 stable state, or the conditions for changing the associated flip-flop from a 0 to a 1-representing state. Two partial-changing transformations are required to completely define the changing transformations of a flip-flop; one defining the 0-to-1 change and the other the 1-to-0 change. The logical sum of two partial-changing transformations is equal to the complete changing transformation.

For example, a partial-changing equation for triggering a flip-flop to the true state may be written as $1F = \overline{F} \cdot G$, where $1F$ = a signal for triggering the F flip-flop from the false state to the true state of the flip-flop;

$\overline{F}$ = the false state of operation of the F flip-flop;

$G$ = a first signal from a source external to the F flip-flop; and the dot (.) between $\overline{F}$ and $G$ represents an "and" proposition in which $\overline{F}$ and $G$ have to be true in order for a $1F$ triggering signal to be produced.

Similarly, a partial-changing equation for triggering the F flip-flop to its false state may be written as $0F = F \cdot H$, where $0F$ = a signal for triggering the F flip-flop from the true state to the false state of the flip-flop;

$H$ = a second signal from a source external to the F flip-flop.

The partial-changing functions set forth above may now be combined into one function completely listing the changing transformations for the F flip-flop. This changing transformation may be written as $Cf = \overline{F} \cdot G, + F \cdot H$, where $Cf$ = a signal for changing the F flip-flop from the false state to the true state of the flip-flop or for changing the F flip-flop from the true state of the false state of the flip-flop.

In addition to the three basic types of transformations, a fourth type of transformation is described in the second copending application; the fourth type being referred to as a simplified partial-changing transformation, since it is derived from a partial-changing transformation by means of a novel simplification technique. The four types of transformations are re-introduced in the present specification and explained briefly, reference being made to the second copending application for further details.

In both of the copending applications the particular counting code and cycle which is desired is first determined, and then the transformation functions defining this code and cycle are derived. While for each counter thus defined, there is a set of transformation functions which provides the simplest gating circuits and allows minimization of power, there is no assurance that the particular code which has already been selected is the simplest to mechanize, or that the flip-flops providing voltage-state signals for controlling the gating circuits are evenly loaded. In binary flip-flop counters of the type described in the first copending application, for example, the "and" gating circuit controlling the Nth flip-flop (where N is any integer) has N−1 input terminals, necessitating a corresponding number of diodes, where diode "and" circuits are utilized, or a corresponding number of control grids, where vacuum-tube "and" circuits are utilized. In addition to the complexity of the gating circuits in the binary counter, the flip-flop load distribution is unbalanced since one of the flip-flops produces a voltage-state signal which is utilized to control N−1 gating circuits, whereas another has no load whatsoever.

According to the present invention, the transformation functions are derived first according to principles which insure that the gating circuits will be simple and that the flip-flop load will be evenly distributed. The even distribution of the load results from the fact that each flip-flop has its output voltages introduced to substantially the same number of input terminals in the counter as the output voltages of the other flip-flops. Another way in which the load can be considered to be evenly distributed is that each input terminal in the counter generally has introduced to it only the output voltage from one of the flip-flops in the counter. Having thus defined a simple, balanced-load, flip-flop counter; the code and counting cycle are determined. A counter having any cycle desired may be defined in this manner, the code being, in effect, predetermined by the transformation functions, which define a set of simple gating circuits and place a balanced load on the flip-flops. By code is meant the interrelationship between the different flip-flops in the counter to obtain the desired count. This interrelationship can be set forth by logical equations for each counter included in the invention, as will become more apparent subsequently.

The basic embodiment of the present invention comprises: a plurality of flip-flops producing voltage-state signals corresponding to their stable states, respectively; and a transformation matrix responsive to the voltage-state signals and to applied counting pulses for producing control signals which control the sequence of stable states of the flip-flops. The transformation matrix is mechanized according to a set of transformation functions, one for each flip-flop in the counter. These functions are derived according to principles which insure that the gating circuits in the transformation matrix will be simple and that the load placed upon the flip-flops will be evenly distributed.

Accordingly, it is an object of the present invention to provide a binary-coded flip-flop counter mechanized according to a set of transformation functions defining simple gating circuits and providing a balanced load for the flip-flops in the counter.

Another object of the present invention is to provide a high-speed counter in which pulses to be counted are applied to each of a plurality of flip-flops through a single gating matrix; the counter including a minimum of gating circuits.

A further object of the invention is to provide a binary-coded flip-flop counter wherein a transformation matrix is utilized to produce control signals determining the sequence of the counter, the transformation matrix being responsive to voltage-state signals produced by the flip-flops and to the applied counting pulses and being mechanized in such a manner as to provide a balanced load for the flip-flops. By sequence of the counter is meant the pattern of the different flip-flops in the counter to represent different numbers. For example, the flip-flops in the counter may have a first pattern of operation to represent a first number such as "1" and may have a second pattern of operation to represent a second number such as "2". The changes in the pattern of operation of the flip-flops in the counter from each number to the next may be considered as the sequence of the counter.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Figure 1:
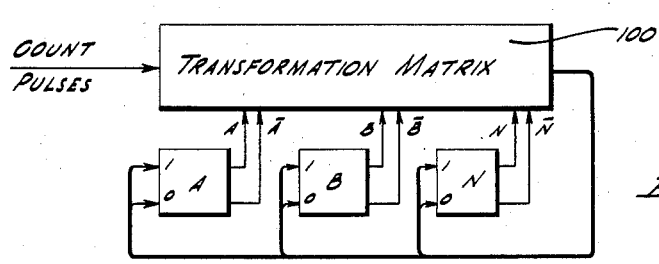
Fig. 1 is a block diagram of the basic embodiment of the present invention.

Referring now to Fig. 1, there is shown one embodiment of a binary-coded counter according to the present invention in which pulses $Cp$ to be counted are applied to a transformation matrix 100 which produces control signals for actuating a plurality of flip-flop stages A, B, . . . and N, where N is utilized to indicate that any number of stages may be included.

Before proceeding to consider specific counters which are mechanized according to the present invention, it is necessary to consider the novel principles which make it possible to select a set of transformation functions that define a minimum amount of gating circuits and provide balanced loading for the flip-flops.

The notation which is utilized in the explanation which follows is consistent with that utilized in the second copending application. The changing transformations which are considered below are represented by "C" followed by the letters $a$, $b$, . . . or $n$ indicating the particular flip-flop which is controlled. The partial-changing transformations are represented in the same manner as the corresponding changing transformation with the addition of the number 1 or 0 indicating whether the flip-flop is changed to 1 or changed to 0. Thus, the partial-changing transformation $Cb0$ indicates the conditions under which flip-flop B is changed from a stable-state representing binary 1 to a stable-state representing 0. The setting transformations are designated by the symbol S plus the letters $a$, $b$, . . . $n$ and either 1 or 0 indicating whether the flip-flop is set to 1 or set to 0.

It should be appreciated that the operations of flip-flops may be controlled by setting functions as well as changing functions. For example, the flip-flop F is triggered to its true state for the condition $1F=\bar{F}.G$ only when $\bar{F}$ and G are simultaneously true. A changing function indicates, therefore, when a triggering signal is introduced to a flip-flop. On the other hand, a setting function indicates when a flip-flop remains in its present state of operation. For example, for a condition $Sa1=B$, the A flip-flop remains in its true state as long as B remains true. When B becomes false, the A flip-flop becomes triggered to its false state.

In the second copending application it is established that a 0-to-1 partial-changing transformation in the form: $Cf1=\bar{F}.Q(A, \ldots N)$ may be reduced to the simplified partial-changing transformation: $1F=Q(A, \ldots N)$, where $\bar{F}$ is the complementary signal produced by any of the flip-flops A through N and $Q(A, \ldots N)$ is any function of the other flip-flop signals, where $(A, \ldots N)$ identifies flip-flops and Q refers to flip-flop output. In a similar manner it is established that the 1-to-0 partial-changing transformation in the form:

$$Cf0=\bar{F}.Q(A, \ldots N)$$

may be reduced to the simplified partial-changing transformation: $0F=Q(A, \ldots N)$.

It is also pointed out in the second copending application that each changing transformation is the logical sum of the corresponding partial-changing transformations. Thus, $Cf=Cf1+Cf0$. It follows, then, that a changing transformation in the form:

$$Cf=\bar{F}.Q^1(A, \ldots, N)+F.Q^2(A, \ldots N)$$

may be reduced to the simplified partial-changing transformations:

$$1F = Q^1(A, \ldots N)$$
$$0F = Q^2(A, \ldots N)$$

The simplest gating circuit is one which is utilized to apply count pulse $Cp$ directly to the associated flip-flop. For example, the A flip-flop may be triggered from its false state to its true state or from its true state to its false state upon the introduction of each clock pulse. This may be represented as $Ca = Cp$, where
$Ca =$ a changing function to indicate a triggering of the A flip-flop from one state of operation to the other;
$Cp =$ a clock signal.

If the A-flip-flop and the B flip-flop were included in a counter having only two flip-flops, $Ca = Cp$ might represent a simplified form of $$Ca = (\bar{A} \cdot \bar{B} + A \cdot \bar{B} + \bar{A} \cdot B + A \cdot B)Cp$$

As will be seen, the proposition $\bar{A} \cdot \bar{B} + A \cdot \bar{B} + \bar{A} \cdot B + A \cdot B$ is always true since it represents the only possible combinations for operation of the A and B flip-flops. From this, it can be seen that $$Ca = (\bar{A} \cdot \bar{B} + A \cdot \bar{B} + \bar{A} \cdot B + A \cdot B)Cp = Cp$$

Even when more than one flip-flop is included in a counter, the maximum count of the counter is only a decimal value of "2" when each flip-flop is triggered directly by the clock pulse and the count is initiated from a value of "1." For example, the flip-flops A and B may be included in a counter such that each flip-flop is triggered by the clock pulse from one state of operation to the other. Thus, $Ca = Cp$ and $Cb = Cp$. By this arrangement, the A and B flip-flops are effectively in parallel so that only one of the flip-flops is instrumental in providing a count. As is well known, a single flip-flop can only provide two different indications corresponding to "1" or "2."

In order to obtain a count higher than "2," certain of the flip-flops in the counter must be triggered upon the occurrence of particular output voltages from at least one other flip-flop in the counter. In other words, certain of the flip-flops must be responsive to signals representing the voltage states of at least one other flip-flop in the counter.

As will be seen more clearly subsequently, certain flip-flops in each counter may be triggered by each clock pulse so as to be responsive to the voltage states of none of the other flip-flops in the counter. Each of the other flip-flops in the counter is generally responsive to the voltage state of only one other flip-flop in the counter. In this way, counters having balanced loads on the different flip-flops in the counter are obtained.

It will be established that any gating circuit responsive to only one flip-flop signal may be defined by a changing function in the form: $Cf = (\bar{F} \cdot G + F \cdot H) \cdot Cp$, where G and H are voltage-state signals which may be produced by the same section of a flip-flop, by different sections of the same flip-flop, or by different flip-flops.

If G and H are produced by the same section of a flip-flop, that is $G = H$, it is apparent that the function $Cf$ may be reduced to one in the form: $Cf = G \cdot Cp$. If H is produced by the complementary section of flip-flop G, $Cf$ becomes: $Cf = (\bar{F} \cdot G + F \cdot \bar{G}) \cdot Cp$; which, it will be shown, may be replaced by the setting function:

$$Sf1 = \overline{Sf0} = G \cdot Cp$$

By "complementary section" of a flip-flop is intended to mean the other of the two states of operation of the flip-flop. For example, if the first section of the G flip-flop is considered as G (or true), the complementary section of the flip-flop would be the $\bar{G}$ (or false) state of operation. If G is produced by the complementary section of flip-flop H, $Cf$ is then in the form:

$$(\bar{F} \cdot \bar{H} + F \cdot H) \cdot Cp$$

which may be replaced by the setting function:

$$Sf1 = Sf0 = \bar{H} \cdot Cp$$

Finally, if G and H are signals produced by different flip-flops, then function $Cf$ may be reduced to the simplified partial-changing functions: $1F = G \cdot Cp$; $0F = H \cdot Cp$; this case being considered as providing a "mixed" function, since the control of the flip-flop F is dependent upon the signals of two different flip-flops.

After flip-flop F is operated upon according to a changing function $Cf$, its output signal F becomes the signal F' defined by the function: $F' = \bar{F} \cdot Cf + F \cdot \overline{Cf}$, indicating that F' is the complement of previous signal F after flip-flop F is triggered as required by the condition: $Cf = 1$; and that F' is equal to previous signal F when $Cf$ is equal to 0 $(\overline{Cf} = 1)$ and flip-flop F is not triggered. Substituting for $Cf$ and $\overline{Cf}$, F' becomes:

$$F' = \bar{F} \cdot (\bar{F} \cdot G + F \cdot H) + F \cdot (F + \bar{G}) \cdot (\bar{F} + \bar{H})$$
$$= \bar{F} \cdot G + F \cdot (F \cdot \bar{H} + \bar{G} \cdot F + \bar{G} \cdot \bar{H})$$
$$= \bar{F} \cdot G + F \cdot \bar{H} \cdot (1 + \bar{G})$$
$$= \bar{F} \cdot G + F \cdot \bar{H}$$

where signal $Cp$ is omitted since F' represents a voltage-state signal.

When G and H are the same variable, F' is in the form: $F' = \bar{F} \cdot G + F \cdot \bar{G}$. When G and H are complementary variables, F' becomes equal to G, when $\bar{H}$ is replaced by G, or equal to $\bar{H}$ when G is replaced by $\bar{H}$; thus establishing the fact that the changing function:

$$Cf = (\bar{F} \cdot G + F \cdot \bar{G}) \cdot Cp$$

may be replaced with the setting function:

$$Sf1 = \overline{Sf0} = G \cdot Cp$$

and that the changing function: $Cf = (\bar{F} \cdot \bar{H} + F \cdot H) \cdot Cp$ may be replaced by the setting function: $Sf1 = \overline{Sf0} = \bar{H} \cdot Cp$.

Once the basic transformation functions defining minimum gating circuits have been established, the code and cycle of the corresponding counter may be determined from a stable, wherein a set of reference counts are transformed into a second set of counts according to the transformation functions. For convenience, the reference counts may be in a conventional binary code, although any code may be used. In Table I below, columns A and B represent conventional binary variables and columns A' and B' represent the transformation of these variables according to the functions:

$$Ca = (\bar{A} \cdot B + A \cdot \bar{B}) \cdot Cp$$
$$Cb = A \cdot Cp$$

Table I

| A B | A' B' | Sequence |
|-----|-------|----------|
| 0 0 | 0 0   | L        |
| 0 1 | 1 1   | 1        |
| 1 0 | 0 1   | 3        |
| 1 1 | 1 0   | 2        |

Referring now to Table I, it will be noted neither A nor B is changed after the reference count 00 represented by the condition: $\bar{A} \cdot \bar{B} = 1$, and consequently the counter "locks" at 00; thus, the letter "L" is placed opposite to count 00.

Flip-flop A is triggered after the count: 01 $(\bar{A} \cdot B = 1)$, transforming the count 01 to the count 11 which may be considered as the first transition in a cycle of 3. Flip-flop B is triggered after the count 11, since A is equal to 1; and thus, the second count in the scale-of-3 sequence is 10. Finally, both flip-flops A and B are triggered after the count 10, since $A.\bar{B}$ is equal to 1, causing a count pulse to trigger flip-flop A; and A is equal to 1, causing a count pulse to trigger flip-flop B. Thus, a cycle of 3 is completed, as the counter returns to the stable state 01 which was assumed to be the first count in the sequence of 3.

It will be noted that several other similar counters may be derived from the functions given above. For example, by permutating or interchanging the signals of flip-flops A and B, there is provided the functions:

$$Cb = (\bar{B}.A + B.\bar{A}).Cp$$

$$Ca = B.Cp$$

represented in Table II.

Table II

| A B | A' B' | Sequence |
|-----|-------|----------|
| 0 0 | 0 0   | L        |
| 0 1 | 1 0   | 1        |
| 1 0 | 1 1   | 2        |
| 1 1 | 0 1   | 3        |

Similarly, complementing the signals of either of flip-flops A or B, or both A and B; provides the functions:

$$Ca = (A.B + \bar{A}.\bar{B}).Cp$$

$$Cb = \bar{A}.Cp$$

where signals A and $\bar{A}$ are complemented, the counting cycle being shown in Table III:

Table III

| A B | A' B' | Sequence |
|-----|-------|----------|
| 0 0 | 1 1   | 1        |
| 0 1 | 0 0   | 3        |
| 1 0 | 1 0   | L        |
| 1 1 | 0 1   | 2        |

$$Ca = (\bar{A}.\bar{B} + A.B).Cp$$

$$Cb = A.Cp$$

where signals B and $\bar{B}$ are complemented, the counting cycle being shown in Table IV:

Table IV

| A B | A' B' | Sequence |
|-----|-------|----------|
| 0 0 | 1 0   | 1        |
| 0 1 | 0 1   | L        |
| 1 0 | 1 1   | 2        |
| 1 1 | 0 0   | 3        |

$$Ca = (A.\bar{B} + \bar{A}.B).Cp$$

$$Cb = \bar{A}.Cp$$

where both flip-flop A and B signals are complemented, the counting cycle being shown in Table V:

Table V

| A B | A' B' | Sequence |
|-----|-------|----------|
| 0 0 | 0 1   | 1        |
| 0 1 | 1 0   | 2        |
| 1 0 | 0 0   | 3        |
| 1 1 | 1 1   | L        |

There are four other sets of functions and corresponding sequence tables which are obtained by complementing the signals in the permutated set above.

As will be seen, a considerable number of sets of transformations may be obtained for each counter even when only two flip-flops are in the counter. It may be shown from what has been considered that each set of transformations may be considered to represent $N' \times 2^N$, similar sets that may be derived therefrom by permutating or complementing certain flip-flop signals where N equals the number of flip-flops in the counter represented by the set of transformations. For example, by formula $N' \times 2^N$, it will be seen that eight different sets of transformations may be obtained for a counter having $N=2$ flip-flops. Four sets of transformations have been set forth above. It is believed that a person skilled in the art would be able to derive the other four sets of transformations from the above discussions and from the four sets of transformations already set forth in the specification. Eliminating all of the sets of functions which may be obtained by permutating or complementing the variables in the basic functions, the following are the basic functions for two flip-flop counters, according to the present invention:

(1)

$$Ca = (\bar{A}.B + A.\bar{B}).Cp$$

$$Cb = A.Cp$$

(2)

$$Ca = (\bar{A}.B + A.\bar{B}).Cp$$

$$Cb = (\bar{A}.\bar{B} + A.B).Cp$$

(3)

$$Ca = (\bar{A}.B + A.\bar{B}).Cp$$

$$Cb = (A.\bar{B} + \bar{A}.B).Cp$$

(4)

$$Ca = B.Cp$$

$$Cb = A.Cp$$

The count sequences for these functions are tabulated in Table VI, below:

Table VI

| A B | (1)   | (2) | (3) | (4)    |
|-----|-------|-----|-----|--------|
| 0 0 | L     | 1   | L   | L-3-3' |
| 0 1 | 1     | 2   | 1   | 1      |
| 1 0 | 3     | 4   | 2   | 1'     |
| 1 1 | 2     | 3   | L   | 2-2'   |

The operation of the A and B flip-flops in accordance with the logical equations of set 1 may be seen from the following discussion. Assume that the A flip-flop is initially false and the B flip-flop is true. This corresponds to a value of "1", as may be seen from vertical column 1 in Table 6. Since only one of the A and B flip-flops is true, the A flip-flop becomes triggered upon the introduction of the first clock signal $Cp$. This causes the A flip-flop to change from a false state to a true state. However, the B flip-flop dies not become triggered since it can be triggered only when the A flip-flop is in its true state before the introduction of the clock pulse $Cp$. Because of this, the A and B flip-flops are both in their true state after the introduction of the first clock signal $Cp$. This corresponds to a decimal value of "2" in vertical column 1 of Table VI.

Since both A and B are true, the operation of the A flip-flop cannot be changed upon the introduction of the next clock signal $Cp$. However, the operation of the B flip-flop changes from a true state to a false state since the A flip-flop is true. The respective operations of the A and B flip-flops in their true and false states correspond to a decimal value of "3" in vertical column (1) of Table VI.

Upon the introduction of the next clock signal $Cp$, the A flip-flop changes from its true state to its false state. The reason for this is that only one of the two flip-flops is true before the introduction of the clock signal. At the same time, the B flip-flop changes from a false state to a true state since the A flip-flop is true before the introduction of the clock pulse $Cp$. When the A flip-flop becomes false and the B flip-flop becomes true, the flip-flops are in a state of operation corresponding to a decimal value of "1". In this way, the A and B flip-flops return to their initial state for the commencement of a new count. By such an arrangement, a cyclic count between "1" and "3", inclusive, is obtained upon the introduction of successive clock pulses.

It may sometimes happen that both A and B are in their false states of operation. When this occurs, the operation of the A flip-flop cannot become changed because of the requirement that one of the flip-flops must be in its true state in order for the A flip-flop to be triggered. The B flip-flop also cannot be triggered since it can be triggered only when the A flip-flop is true. For this reason, the A and B flip-flops remain locked in their present states of operation. This is designated by the symbol "L" in vertical column 1 of Table VI.

Consider now the second set of logical equations. These may be repeated as $$Ca = (\bar{A}.B + A.\bar{B})Cp$$

$$Cb = (\bar{A}.\bar{B} + A.B)Cp$$

The A and B flip-flops may be considered to be in their false state for a decimal value of "1", as shown in vertical column 2 of Table VI. With the A and B flip-flops in their false states of operation, the B flip-flop becomes triggered to its true state upon the occurrence of the first $Cp$ signal but the A flip-flop remains false. This corresponds to a decimal value of "2" in vertical column 2 of Table VI.

Since only the B flip-flop is true, the second clock signal causes A to become triggered true and the B flip-flop to remain true. This corresponds to a decimal value of "3" in vertical column 2 of Table VI. Because of the true states of both the A and B flip-flops, A remains true and B becomes triggered to its false state when the third clock signal $Cp$ occurs. This represents a decimal value of "4" in vertical column 2 of Table VI. The A and B flip-flops return to a decimal value of "1" upon the occurrence of the next clock signal so as to initiate a new count.

The third set of equations is as follows:

$$Ca = (\bar{A}.B + A.\bar{B}).Cp$$

$$Cb = (A.\bar{B} + \bar{A}.B)Cp$$

As will be seen, the A and B flip-flops cannot be triggered when they are both true or both false. This is indicated by the letters "L" in vertical column 3 of Table VI. When A is false and B is true, A becomes true and B becomes false upon the introduction of the first $Cp$ signal. A returns to its false state and B returns to its true state upon the introduction of the next clock signal. In this way, the A and B flip-flops can count only the values of "1" and "2".

In the fourth set of equations, $$Ca = B.Cp$$

$$Cb = A.Cp.$$

Various sequences of operation are possible when the A and B flip-flops are connected in accordance with the fourth set of logical equations. For example, the A and B flip-flops may both be initially false. This would prevent either of the A or B flip-flops from being triggered to the true state. This is represented by the symbol "L" in vertical column 4 of Table VI.

The A flip-flop may also be initially false and the B flip-flop initially true, as represented by the symbol "1" in the vertical column 4 of Table VI. Upon the occurrence of the first $Cp$ signal, the B flip-flop remains true and the A flip-flop becomes triggered true to represent a decimal value of "2" in vertical column 4 of Table VI. The next clock signal $Cp$ causes both A and B to become false to represent a decimal value of "3" in vertical column 4 of Table VI. When both A and B become false, the flip-flops become locked as described above. In this way, the flip-flops count from "1" to "3" and then cannot return to a value of "1" for the initiation of a new count.

A decimal value of "1" may also be represented by a true state of operation of the A flip-flop and a false state of operation of the B flip-flop. This is indicated by the symbol "1'" in vertical column 4 of Table VI to distinguish the count from the other counts in the column. Upon the introduction of the first $Cp$ signal, the A flip-flop remains true and the B flip-flop becomes true to represent a decimal value of "2". This is indicated at "2'" in vertical column 4 of Table VI. Both of the A and B flip-flops then become false when the next $Cp$ signal occurs. This is indicated at "3" in vertical column 4 of Table VI. The A and B flip-flops then become locked in their false states of operation, as described in detail previously.

In many cases where there are several counting cycles defined by a set of transformation functions, it is possible to obtain a set of simplified functions that define only one of the cycles, the other cycle being eliminated. Thus, function set 1 defining the three counter may be simplified by eliminating the cycle of 1, or locking count. The simplification is performed by adding the term $\bar{A}.\bar{B}$ to both $Ca$ and $Cb$, allowing the counter to change after 00 to 11, rather than to lock at 00 as shown in Table I, above. The functions then may be simplified as follows:

(1) $Ca = (\bar{A}.B + A.\bar{B} + \bar{A}.\bar{B}).Cp = (\bar{A} + \bar{B}).Cp$ $Cb = (A + \bar{A}.\bar{B}).Cp = (A + \bar{B}).Cp$ The simplified functions then define the cycle of Table VII:

Table VII

| A B | A' B' | Sequence |
|-----|-------|----------|
| 0 0 | 1 1   | ------   |
| 0 1 | 1 1   | 1        |
| 1 0 | 0 1   | 3        |
| 1 1 | 1 0   | 2        |

It will be noted that the counter no longer locks at 00, but rather enters into the cycle of 3 by passing through 00 and 11.

The changing transformations, above, may now be placed into their minimum gating-circuit forms:

(1) $1A = Cp \quad 1B = Cp$ ;
$0A = \bar{B}.Cp \quad 0B = A.Cp$ (2) $Sa1 = B.Cp; \quad Sb1 = \bar{A}.Cp$ (3) $Sa1 = B.Cp; \quad Sb1 = A.Cp$ (4) $Ca = B.Cp; \quad Cb = A.Cp$ Whenever two counters have cycles having no common factor, they may be operated simultaneously to provide a cycle equal to the product of the separate cycles. Thus, the 3 and 4 stable state counters described above may be operated simultaneously to provide a 12 counter, and the 3 counter may be operated simultaneously with a 2 counter (provided by a flip-flop which is continually triggered) to provide a 6 counter. The simplified functions and a cycle table for a scale-of-6 counter using the simplified 3 counter described above and a third flip-flop C are shown below:

$$1A = Cp \quad 1B = Cp$$
$$\quad ; \quad\quad ; Cc = Cp$$
$$0A = \overline{B}.Cp \quad 0B = A.Cp$$

*Table VIII*

| A B C | A' B' C' | Sequence |
|-------|----------|----------|
| 0 0 0 | 1 1 1    |          |
| 0 0 1 | 1 1 0    |          |
| 0 1 0 | 1 1 1    | 6        |
| 0 1 1 | 1 1 0    | 3        |
| 1 0 0 | 0 1 1    | 2        |
| 1 0 1 | 0 1 0    | 5        |
| 1 1 0 | 1 0 1    | 4        |
| 1 1 1 | 1 0 0    | 1        |

The simplified set of transformation functions defining the scale-of-6 counters may be converted directly to another, equivalent set, by complementing the signals of either or both of flip-flops A and B, and then interchanging the 1 and 0 input functions of the corresponding flip-flop. It should be appreciated that this complementation can be performed mentally and not by any physical structure since it is merely for the purpose of obtaining a new set of transformation functions. Thus, when signals of flip-flop A are complemented and the 1-and-0 input functions for flip-flop A are interchanged, a first set of complemented functions may be expressed as follows:

$$1A = \overline{B}.Cp \quad 1B = Cp$$
$$\quad ; \quad\quad ; Cc = Cp$$
$$0A = Cp \quad 0B = \overline{A}.Cp$$

A second set of complemented functions is obtained by interchanging the 1-and-0 input functions for flip-flop B in the original set and complementing the output signals of flip-flop B. This provides the functions:

$$1A = Cp \quad 1B = A.Cp$$
$$\quad ; \quad\quad ; Cc = Cp$$
$$0A = B.Cp \quad 0B = Cp$$

Finally, a third set of complemented functions is obtained by interchanging the 1-and-0 input functions for both flip-flops A and B in the original set and then complementing all voltage-state signals. This provides the set:

$$1A = B.Cp \quad 1B = A.Cp$$
$$\quad ; \quad\quad ; Cc = Cp$$
$$0A = Cp \quad 0B = Cp$$

The flip-flop signals may, of course, be complemented in the basic changing functions. Thus, the third complemented set above may be obtained by complementing the signals of flip-flops A and B in the basic changing functions for the original set:

$$Ca = (\overline{A} + \overline{B}).Cp; \ Cb = (A + \overline{B}).Cp; \ Cc = Cp$$

and then simplifying.

It is interesting to compare the counting sequence provided by the third complemented set of functions with that obtained from the original set. The original set can be repeated as $$1A = Cp \quad 1B = Cp \quad Cc = Cp$$
$$0A = \overline{B}.Cp \quad 0B = A.Cp$$

The third complemented set can be repeated as $$1A = B.Cp \quad 1B = \overline{A}.Cp \quad Cc = Cp$$
$$0A = Cp \quad 0B = Cp$$

The counting sequence of the third complemented set is shown in Table IX:

*Table IX*

| A B C | A' B' C' | Sequence |
|-------|----------|----------|
| 0 0 0 | 0 1 1    | 1        |
| 0 0 1 | 0 1 0    | 4        |
| 0 1 0 | 1 0 1    | 5        |
| 0 1 1 | 1 0 0    | 2        |
| 1 0 0 | 0 0 1    | 3        |
| 1 0 1 | 0 0 0    | 6        |
| 1 1 0 | 0 0 1    |          |
| 1 1 1 | 0 0 0    |          |

If the cycles of the scale-of-6 counters defined by the original set and the third complemented set are compared in sequence order, the sequence being started from counts of 111 and 000, respectively, it is noted that the counts are complementary. This is shown in Table X:

*Table X*

| Sequence | Original set A B C | Third Complemented set A B C |
|----------|--------------------|-----------------------------|
| 1        | 1 1 1              | 0 0 0                       |
| 2        | 1 0 0              | 0 1 1                       |
| 3        | 0 1 1              | 1 0 0                       |
| 4        | 1 1 0              | 0 0 1                       |
| 5        | 1 0 1              | 0 1 0                       |
| 6        | 0 1 0              | 1 0 1                       |

The counts of the two sequences bear a complementary relationship because the signals of flip-flops A and B have been complemented to provide the conversion from the first set to the third complemented set, and because flip-flop C is complemented, in effect, by the shift in the starting count.

Flip-flop C is effectively complemented since it has a true indication for a decimal value of "1" in the original set and a false indication for a decimal value of "1" in the third complemented set. It should be appreciated that the initial values of the A, B and C flip-flops for each set are purely arbitrary since the flip-flops operate on a closed loop basis. In a closed loop, the flip-flops count to a maximum value and then return to an initial value at the next clock pulse Cp for the commencement of a new counting cycle. On this basis, the A, B and C flip-flops can all be in their true state for a decimal value of "1" in the original set of transformations and can all be in their false state for a decimal value of "1" in the third complemented set of transformations. These values are chosen since the A, B and C flip-flops are in complementary states of operation for each value in the original and third complemented set.

While there are many three flip-flop counters which may be mechanized according to the present inventions, for simplicity, only five basic types are considered below, illustrating counters having major cycles of four, five, six, seven, and eight, respectively. It should be understood, however, that for each of the five counters described, there are $3' \times 2^3$ others which have the same cycle; and that not all of the basic types of three flip-flop counters are shown. The counters having cycles of four, five, six, seven, and eight counts are mechanized, respectively, according to the function sets 1, 2, 3, 4, and 5, shown below:

(1)
$$1A = B.Cp \quad 1B = \overline{A}.Cp \quad 1C = A.Cp$$
$$\quad ; \quad\quad ; \quad\quad ;$$
$$0A = C.Cp \quad 0B = C.Cp \quad 0C = B.Cp$$

(2)
$$1A = B.Cp \quad 1B = A.Cp$$
$$\quad ; \quad\quad ; Cc = \overline{B}.Cp$$
$$0A = C.Cp \quad 0B = \overline{A}.Cp$$

$$
(3) \quad \begin{array}{ll} 1A=B.Cp & 1B=A.Cp \\ & ; \quad ; Cc=B.Cp \\ 0A=C.Cp & 0B=\overline{A}.Cp \end{array}
$$

$$
(4) \quad Ca=C.Cp; \quad \begin{array}{l} 1B=\overline{A}.Cp \\ ; Cc=B.Cp \\ 0B=A.Cp \end{array}
$$

$$
(5) \quad \begin{array}{ll} 1A=B.Cp & 1B=\overline{A}.Cp \\ & ; \quad ; Cc=\overline{B}.Cp \\ 0A=C.Cp & 0B=A.Cp \end{array}
$$

The sequences of these counters are shown in Table XI:

*Table XI*

| A B C | (1) | (2) | (3) | (4) | (5) |
|-------|-----|-----|-----|-----|-----|
| 0 0 0 | 1   | 1   | L   | 1   | 1   |
| 0 0 1 | 1'  | 2   | L   | 6   | 4   |
| 0 1 0 | 2   | 1'  | 1   | 2   | 5   |
| 0 1 1 | 2'  | 4'  | 3   | 3   | 2   |
| 1 0 0 | 3'  | 2'  | 4   | L   | 7   |
| 1 0 1 | 4'  | 5'  | 2   | 5   | 8   |
| 1 1 0 | 3   | L   | 5   | 4   | 6   |
| 1 1 1 | 4   | 3'  | 6   | 7   | 3   |

It will be noted that set 1 defines a counter having two separate cycles of four counts each; the sequence of one cycle being represented by primed numbers. If the counting sequence is initiated at a count of 000, the counter cycles according to one code; and if at a count of 001, it cycles according to a second code. The manner in which the sequence of the counters defined by function sets: 1, 2, 3, 4, and 5 are obtained from the corresponding functions should be apparent from the examples already considered, and further discussion, therefore, is considered unnecessary.

The five counter defined by function set 2, above, may be simplified by eliminating the cycle of 2. If counts 000 and 001 are converted to 111 and 110, respectively, a count pulse signal may be continuously applied to the 1 input circuits of flip-flops A and B. The simplified functions and corresponding transformed counts then are:

$$
\begin{array}{ll} 1A=Cp & 1B=Cp \\ & ; \quad ; Cc=\overline{B}.Cp \\ 0A=C.Cp & 0B=\overline{A}.Cp \end{array}
$$

*Table XII*

| A B C | A' B' C' | Sequence |
|-------|----------|----------|
| 0 0 0 | 1 1 1    |          |
| 0 0 1 | 1 1 0    |          |
| 0 1 0 | 1 0 0    | 1        |
| 0 1 1 | 1 0 1    | 4        |
| 1 0 0 | 1 1 1    | 2        |
| 1 0 1 | 0 1 0    | 5        |
| 1 1 0 | 1 1 0    | L        |
| 1 1 1 | 0 1 1    | 3        |

A second, simplified five counter which is very similar to that just described is defined by the functions:

$$
\begin{array}{lll} 1A=Cp & 1B=Cp & 1C=Cp \\ & ; & ; \\ 0A=C.Cp & 0B=\overline{A}.Cp & 0C=B.Cp \end{array}
$$

This counter places a somewhat less load on flip-flop B, since signal B controls the gating of count pulses to only the 0 input circuit of flip-flop C, rather than to both the 1 and 0 input circuits.

Figure 2:
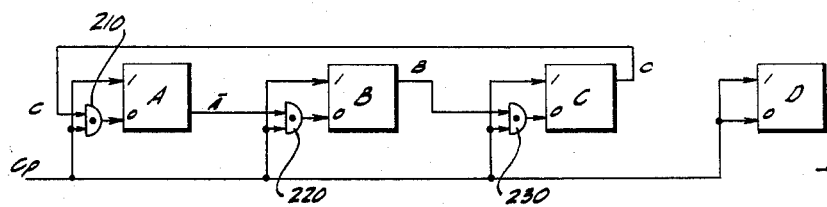
Fig. 2 is a schematic diagram of a scale-of-10 binary-coded counter, employing a scale-of-5 binary-coded counter.

A ten-stable-state counter, utilizing the second, simplified five counter and a scale-of-2 counter operated simultaneously, is shown in Fig. 2. Flip-flop D, shown in Fig. 2, provides the scale-of-2 counter and is triggered continuously by directly applied count pulses, $Cp$.

Count pulses $Cp$ are also applied directly to the 1 input circuits of flip-flops A, B, and C.

Each of the "and" functions in the defining set of transformation functions is provided by an "and" circuit; the functions $C.Cp$, $\overline{A}.Cp$, and $B.Cp$ being provided by "and" circuits 210, 220, and 230, respectively. Count pulses $Cp$ are applied to one input terminal of each of the "and" circuits, since the variable $Cp$ is in each of the corresponding "and" functions. Signals C, $\overline{A}$, and B are applied to second input terminals of "and" circuits 210, 220, and 230, respectively. Each "and" circuit produces an output pulse when a count pulse is applied and the controlling voltage-state signal is a high-level signal. Thus, when signal C is a high-level signal representing binary 1, "and" circuit 210 responds to an applied count pulse $Cp$ and produces a pulse which is applied to the 0 input circuit of flip-flop A. In a similar manner, "and" circuits 220 and 230 provide pulses corresponding to the functions: $\overline{A}.Cp$ and $B.Cp$, respectively.

The logical equations controlling the operation of the counter shown in Figure 2 may be written as follows:

$$
\begin{array}{llll} 1A=Cp & 1B=Cp & 1C=Cp & Cd=Cp \\ 0A=C.Cp & 0B=\overline{A}.Cp & 0C=B.Cp & \end{array}
$$

The table representing the patterns of operation of the A, B, C and D flip-flops for the different decimal values may be written as follows:

*Table XII(A)*

| A B C D | Sequence |
|---------|----------|
| 1 0 1 0 | 1        |
| 0 1 1 1 | 2        |
| 1 0 0 0 | 3        |
| 1 1 1 1 | 4        |
| 0 1 0 0 | 5        |
| 1 0 1 1 | 6        |
| 0 1 1 0 | 7        |
| 1 0 0 1 | 8        |
| 1 1 1 0 | 9        |
| 0 1 0 1 | 10       |
| 1 0 1 0 | 1        |

As will be seen in Table XII(A), a decimal value of "1" may be considered as being represented by true states of operation of the A and C flip-flops and false states of operation of the B and D flip-flops. In accordance with the logical equations set forth above and the connections shown in Figure 2, the B and D flip-flops are triggered to their true state upon the introduction of the first clock signal. The A flip-flop is triggered to its false state at the same time since the C flip-flop was initially true. The B flip-flop remains true since it is triggered false only when A is false before the introduction of the clock signal. The operation of the A flip-flop in its false state and the B, C and D flip-flops in their true states represents a decimal value of "2". This may be seen in Table XII(A).

In like manner, the A, B and C flip-flops become triggered to different patterns of operation to represent the decimal values of "3", "4" and "5". As will be seen, the A, B and C flip-flops are in different combinations of true and false states for each value between "1" and "5", inclusive. When the A, B and C flip-flops are in states of operation indicative of a decimal value of "5", they return to a pattern of operation corresponding to a decimal value of "1" upon the introduction of the next clock signal. In this way, the A, B and C flip-flops operate on a recycling basis every time that five clock signals $Cp$ are introduced to the counter.

The D flip-flop operates to provide a distinction between the first cycle of operation of the A, B and C flip-flops and the second cycle of operation of the A, B and C flip-flops. For example, the A, B and C flip-flops have the same pattern of operation for the decimal value of "1" as for the decimal value of "6". However, the D flip-flop has a false state of operation for the decimal value of "1" and a true state of operation for the decimal value of "6". Because of this, the D flip-flop operates to provide a distinction between values of "1" and "6".

It will be seen from the above discussion that the A, B and C counter operates to indicate a decimal scale of "5" and the D counter operates to indicate a decimal scale of "2". By combining the two counters, a composite counter having a decimal scale of "10" is obtained. Each decimal value in the scale-of-10 counter can be distinguished from every other value in the counter by connecting different output terminals in the A, B, C and D flip-flops to an "and" network. For example, for a decimal value of "8", an "and" network can receive output voltages from the terminals representing the true states of operation of the A and D flip-flops and the terminals representing the false states of operation of the B and C flip-flops. Since the "and" network can pass a signal only upon the simultaneous introduction of "high" voltages to all of its input terminals, a signal can pass through the "and" network only for a decimal value of "8".

"And" circuits for providing the above-described operation are well known in the computer art; suitable circuits, for example, being shown on pages 37 to 45 of High-Speed Computing Devices by Engineering Research Associates, published in 1950 by McGraw-Hill Company, Inc., New York and London, and in an article entitled "Diode coincidence and mixing circuits in digital computers" by Tung Chang Chen in vol. 38 of the Proceedings of the Institute of Radio Engineers, May 1950, on pgs. 511 through 514.

Figure 3:
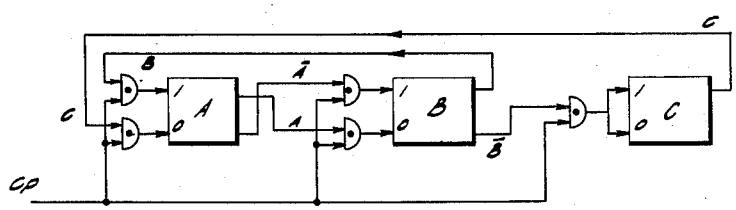
Fig. 3 is a schematic diagram of a scale-of-8 counter.

The scale-of-8 counter defined by function set 5, above, is shown in Fig. 3. The manner in which the "and" circuits shown in Fig. 3 provide the "and" functions: $B.Cp$, $C.Cp$, $\bar{A}.Cp$, $A.Cp$, and $\bar{B}.Cp$ should be apparent from the discussion above. It will be noted that the "and" circuit providing the changing transformation function: $Cc=\bar{B}.Cp$ is coupled to both the 1 and 0 input circuits of flip-flop C, so that the pulse produced, when $\bar{B}$ is equal to 1 and a count pulse is applied, is effective to trigger flip-flop C to its opposite representing state.

Before proceeding to consider the transformation functions defining representative types of 4-flip-flop counters, and the associated sequence tables, it is convenient to develop a simpler approach for obtaining a sequence table directly from a set of simplified transformation functions. It has been shown that the changing transformation function:

$$Cf = (\bar{F}.G + F.H).Cp$$

defines a transformation of flip-flop F such that its signal F', produced after transformation, is related to the signals F and $\bar{F}$, produced before the transformation by the function:

$$F' = \bar{F}.G + F.\bar{H}$$

and that the changing function $Cf$ may be simplified to the functions:

$$1F = G.Cp$$
$$0F = H.Cp$$

Whenever flip-flop F is in a 0-representing state, wherein signals $\bar{F}$ and F are 1 and 0, respectively, the function for F' may be reduced to: $F'=G$; indicating that the transformation function causes flip-flop F to assume a stable state corresponding to the previous state of signal G. In a similar manner, whenever flip-flop F is in a 1-representing state wherein signals F and $\bar{F}$ have values 1 and 0, respectively, the function for F' may be reduced to: $F'=\bar{H}$; indicating that whenever flip-flop F was previously set to 1, it is transformed to the complement of signal H.

As an example of an application of the simplified approach discussed above, consider the transformations shown in Table XIII, where flip-flop F is transformed according to the functions:

$$1F = G.Cp$$
$$0F = H.Cp$$

*Table XIII*

| F | G | H | F' | Row |
|---|---|---|----|-----|
| 0 | 0 | 0 | 0  | 1   |
| 1 | 0 | 0 | 1  | 2   |
| 0 | 1 | 0 | 1  | 3   |
| 1 | 1 | 0 | 1  | 4   |

It will be noted that signal F is 0, in rows 1 and 3, and that in these rows F' is equal to the corresponding signal G. Thus, in row 1: $F=0$, and $F'=G=0$. F is equal to 1 in rows 2 and 4 and, in these rows, F' is equal to the corresponding complement of signal H. Thus, in row 2, F is equal to 1, and $F'=\bar{H}=1$.

Consider now the sequence table for a 4-flip-flop, scale-of-9 counter defined by the transformation function set:

$$1A = C.Cp \quad 1B = \bar{A}.Cp \quad 1C = B.Cp$$
$$; \quad ; \quad ; \quad Cd = \bar{C}.Cp$$
$$0A = D.Cp \quad 0B = A.Cp \quad 0C = \bar{B}.Cp$$

*Table XIV*

| A | B | C | D | A' | B' | C' | D' | Sequence |
|---|---|---|---|----|----|----|----|----------|
| 0 | 0 | 0 | 0 | 0  | 1  | 0  | 1  | 1'       |
| 0 | 0 | 0 | 1 | 0  | 1  | 0  | 0  | 1        |
| 0 | 0 | 1 | 0 | 1  | 1  | 0  | 0  | 7        |
| 0 | 0 | 1 | 1 | 1  | 1  | 0  | 1  | 5        |
| 0 | 1 | 0 | 0 | 0  | 1  | 1  | 1  | 2        |
| 0 | 1 | 0 | 1 | 0  | 1  | 1  | 0  | 2'       |
| 0 | 1 | 1 | 0 | 1  | 1  | 1  | 0  | 3'       |
| 0 | 1 | 1 | 1 | 1  | 1  | 1  | 1  | 3        |
| 1 | 0 | 0 | 0 | 1  | 0  | 0  | 1  | 6'       |
| 1 | 0 | 0 | 1 | 0  | 0  | 0  | 0  | 7'       |
| 1 | 0 | 1 | 0 | 1  | 0  | 0  | 0  | 5'       |
| 1 | 0 | 1 | 1 | 0  | 0  | 0  | 1  | 9        |
| 1 | 1 | 0 | 0 | 1  | 0  | 1  | 1  | 8        |
| 1 | 1 | 0 | 1 | 0  | 0  | 1  | 0  | 8        |
| 1 | 1 | 1 | 0 | 1  | 0  | 1  | 0  | 4'       |
| 1 | 1 | 1 | 1 | 0  | 0  | 1  | 1  | 4        |

It will be noted that whenever A is 0 it is transformed to the corresponding C signal and that whenever A is 1 it is transformed to the complement of the corresponding D signal. The transformation of signals B and C should be apparent from the discussion above. While the transformation function for flip-flop D has been left in its changing transformation form, indicating the mechanization required, it may also be written as:

$$1D = \bar{C}.Cp$$
$$0D = \bar{C}.Cp$$

indicating that whenever D is 0 it is transformed to $\bar{C}$, and that when D is 1, it is transformed to C.

Although there are a considerable number of 4-flip-flop counters according to the present invention, for simplicity, only a few of the basic types are considered. The counters considered have cycles of 8, 10, 11, 13, 15, and 16 and are mechanized, respectively, according to the transformation sets:

(1)

$$1A = C.Cp \quad 1B = A.Cp$$
$$; \quad Cc = \bar{B}.Cp; Cd = B.Cp$$
$$0A = D.Cp \quad 0B = \bar{A}.Cp$$

(2)

$1A = C.Cp$   $1B = A.Cp$   $1C = B.Cp$
$0A = D.Cp$   $0B = \overline{A}.Cp$   $0C = \overline{B}.Cp$ ; $Cd = \overline{C}.Cp$ (3)

$1A = C.Cp$   $1B = A.Cp$   $1C = B.Cp$
$0A = D.Cp$   $0B = \overline{A}.Cp$   $0C = \overline{B}.Cp$ ; $Cd = C.Cp$ (4)

$1A = C.Cp$   $1B = A.Cp$   $1C = B.Cp$
$0A = D.Cp$   $0B = \overline{A}.Cp$   $0C = \overline{B}.Cp$ ; $Cd = \overline{C}.(A+\overline{B}).Cp$ (5)

$1A = C.Cp$   $1B = \overline{A}.Cp$   $1C = B.Cp$
$0A = D.Cp$   $0B = A.Cp$   $0C = \overline{B}.Cp$ ; $Cd = C.Cp$ (6)

$1A = C.Cp$   $1B = A.Cp$
$0A = D.Cp$   $0B = \overline{A}.Cp$ ; $Cc = \overline{B}.Cp$; $Cd = (B + \overline{A}.\overline{C}).Cp$ The counting sequences defined by these transformation sets are shown in Table XV:

Table XV

| ABCD | Set (1) | | Set (2) | | Set (3) | | Set (4) | | Set (5) | | Set (6) | |
|------|---------|------|---------|------|---------|------|---------|------|---------|------|---------|------|
|      | ABCD | Seq. | ABCD | Seq. | ABCD | Seq. | ABCD | Seq. | ABCD | Seq. | ABCD | Seq. |
| 0000 | 0010 | 1  | 0001 | 1   | 0000 | L  | 0001 | 1'  | 0100 | 1  | 0011 | 1  |
| 0001 | 0011 | 1' | 0000 | 2'  | 0001 | L  | 0000 | 2'  | 0101 | 11 | 0010 | 9  |
| 0010 | 1000 | 2  | 1000 | 1   | 1001 | 1  | 1000 | 1   | 1101 | 5  | 1000 | 10 |
| 0011 | 1001 | 2' | 1001 | 1'' | 1000 | 4  | 1001 | 11  | 1100 | 7  | 1001 | 2  |
| 0100 | 0001 | 8' | 0011 | 3'' | 0010 | 11 | 0010 | 13  | 0110 | 2  | 0001 | 8  |
| 0101 | 0000 | 8  | 0010 | 10  | 0011 | 3  | 0011 | 10  | 0111 | 12 | 0000 | 16 |
| 0110 | 1011 | 6  | 1010 | 4   | 1011 | 9  | 1010 | 4   | 1111 | 3  | 1011 | 14 |
| 0111 | 1010 | 4' | 1011 | 8   | 1010 | 1' | 1011 | 8   | 1110 | 13 | 1010 | 4  |
| 1000 | 1110 | 3  | 1101 | 2   | 1100 | 5  | 1101 | 2   | 1000 | L  | 1110 | 11 |
| 1001 | 0111 | 3' | 0100 | 2'' | 0101 | 2  | 0100 | 12  | 0001 | 10 | 0111 | 3  |
| 1010 | 1100 | 5' | 1100 | 5   | 1101 | 2' | 1100 | 5   | 1001 | 9  | 1100 | 5  |
| 1011 | 0101 | 7  | 0101 | 9   | 0100 | 10 | 0101 | 9   | 0000 | 15 | 0101 | 15 |
| 1100 | 1101 | 6' | 1111 | 6   | 1110 | 6  | 1111 | 6   | 1010 | 8  | 1101 | 6  |
| 1101 | 0100 | 7' | 0110 | 3   | 0111 | 3' | 0110 | 3   | 0011 | 6  | 0100 | 7  |
| 1110 | 1111 | 4  | 1110 | L   | 1111 | 7  | 1110 | L   | 1011 | 14 | 1111 | 12 |
| 1111 | 0110 | 5  | 0111 | 7   | 0110 | 8  | 0111 | 7   | 0010 | 4  | 0110 | 13 |

The manner in which the sequences for sets 1, 2, 3, 4, and 6 are obtained should be apparent from the examples already considered. The scale-of-13 counter is obtained by combining the cycles of 3 and 10 defined by set 2; and the scale-of-16 counter is obtained by combining the two cycles of 8 defined by set 1.

The cycles of 3 and 10, defined by set 2 are combined by interchanging two transformed counts, one from each cycle. In the particular case defined by set 5, count 3″ of the 3 cycle is interchanged with count 10 of the 10 cycle. Transformed count 3″ is 0011 (returning the 3 cycle to 1″) and transformed count 10 is 0010 (returning the 10 cycle to 1) so that the interchange of 3″ and 10 causes only a change in D′. The change in D′ removes two of the changing conditions defined by the function: $Cd = \overline{C}.Cp$, since D is no longer changed after the reference counts 0100, or 0101. The change after these counts may be eliminated from the function: $Cd = \overline{C}.Cp$ by adding the algebraic restriction: $\overline{A.B}$, as an "and"

condition, indicating that D is always complemented when C is equal to 0, except when A is 0 and B is 1. Thus, the function $Cd = \overline{C}.Cp$ becomes:

$$Cd = \overline{C}.(\overline{AB}).Cp = \overline{C}.(\overline{A} + \overline{B}).Cp$$

In a similar manner, set 6 is obtained by interchanging transformed counts 1 (0010) and 1′ (0011), defined by set 1. The interchanging of these counts adds two change conditions to the function: $Cd = B.Cp$; one change being added after each of the reference counts 0000, and 0001. Thus, Cd becomes:

$$Cd = (B + \overline{A}.\overline{B}.\overline{C}.\overline{D} + \overline{A}.\overline{B}.\overline{C}.D).Cp$$
$$= (B + \overline{A}.\overline{B}.\overline{C}).Cp = (B + \overline{A}.\overline{C}).Cp$$

Figure 4:
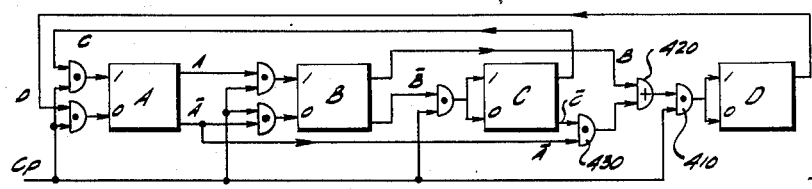
Fig. 4 is a schematic diagram of a scale-of-16 counter.

The scale-of-16 counter shown in Fig. 4 is mechanized according to set 6 in a manner very similar to the mechanization of scale-of-10 and the scale-of-8 counters shown in Figs. 2 and 3, except for the circuit controlling flip-flop D.

Referring now to Fig. 4, it will be noted that a signal corresponding to the input function for flip-flop D, $Cd = (B + \overline{A}.\overline{C}).Cp$ is produced by "and" circuit 410, having count pulse signals Cp applied to one input terminal and a signal corresponding to $B + \overline{A}.\overline{C}$ applied to the other input terminal. The signal corresponding to $B + \overline{A}.\overline{C}$ is produced by "or" circuit 420 which responds to signals B and $\overline{A}.\overline{C}$ applied to separate input terminals. "Or" circuit 420 produces a high-level output signal whenever either or both of signals B and $\overline{A}.\overline{C}$ are high-level signals. Finally, the function $\overline{A}.\overline{C}$ is provided by "and" circuit 430.

"Or" circuits suitable for providing the above-described operation are described in the above-mentioned publications referred to as showing "and" circuits.

It should be apparent from the foregoing description that the present invention may be utilized to provide counters having any cycle desired within the capacity of the number of flip-flops included. It should be understood, then, that the 5-flip-flop transformation sets and sequence table shown below are included only by way of interest and are not intended to limit the scope of the invention. Sets 1, 2, 3, and 4 shown below define counters including cycles of 17, 29, 31, and 32, respectively. The scale-of-32 counter is obtained by combining the 29 and 3 cycles, defined by set 2, by interchanging transformed counts 11000 and 11001, thus changing the function: $Ce = \overline{D}.Cp$ to $Cc = (\overline{D} + \overline{A}.\overline{B}.\overline{C}).Cp$.

(1)

$$1A = D.Cp \quad 1B = \overline{A}.Cp \quad 1C = B.Cp \quad 1D = \overline{C}.Cp$$
$$0A = E.Cp \quad 0B = A.Cp \quad 0C = \overline{B}.Cp \quad 0D = C.Cp \quad ; Ce = \overline{D}$$

(2)

$$1A = D.Cp \quad 1B = \overline{A}.Cp \quad 1C = B.Cp \quad 1D = C.Cp$$
$$0A = E.Cp \quad 0B = A.Cp; \quad 0C = \overline{B}.Cp \quad 0D = \overline{C}.Cp \quad ; Ce = \overline{D}$$

(3)

$$1A = D.Cp \quad 1B = \overline{A}.Cp \quad 1C = B.Cp \quad 1D = C.Cp$$
$$0A = E.Cp \quad 0B = A.Cp \quad 0C = \overline{B}.Cp \quad 0D = \overline{C}.Cp \quad ; Ce = D$$

(4)

$$1A = D.Cp \quad 1B = \overline{A}.Cp \quad 1C = B.Cp \quad 1D = C.Cp$$
$$0A = E.Cp \quad 0B = A.Cp \quad 0C = \overline{B}.Cp \quad 0D = \overline{C}.Cp \quad ; Ce = (\overline{D} + \overline{A}.\overline{B}.\overline{C}).Cp$$

*Table XVI*

| ABCDE | (1) ABCDE | Seq. | (2) ABCDE | Seq. | (3) ABCDE | Seq. | (4) ABCDE | Seq. |
|---|---|---|---|---|---|---|---|---|
| 0 0 0 0 0 | 0 1 0 1 1 | 1' | 0 1 0 0 1 | 1 | 0 1 0 0 0 | 1 | 0 1 0 0 1 | 1 |
| 0 0 0 0 1 | 0 1 0 1 0 | 1 | 0 1 0 0 0 | 21 | 0 1 0 0 1 | 19 | 0 1 0 0 0 | 24 |
| 0 0 0 1 0 | 1 1 0 1 0 | 6 | 1 1 0 0 0 | 11 | 1 1 0 0 1 | 25 | 1 1 0 0 1 | 15 |
| 0 0 0 1 1 | 1 1 0 1 1 | 11 | 1 1 0 0 1 | 12 | 1 1 0 0 0 | 14 | 1 1 0 0 0 | 12 |
| 0 0 1 0 0 | 0 1 0 0 1 | 8' | 0 1 0 1 1 | 14 | 0 1 0 1 0 | 8 | 0 1 0 1 1 | 17 |
| 0 0 1 0 1 | 0 1 0 0 0 | 4' | 0 1 0 1 0 | 8 | 0 1 0 1 1 | 27 | 0 1 0 1 0 | 8 |
| 0 0 1 1 0 | 1 1 0 0 0 | 15 | 1 1 0 1 0 | 17 | 1 1 0 1 1 | 6 | 1 1 0 1 0 | 20 |
| 0 0 1 1 1 | 1 1 0 0 1 | 13 | 1 1 0 1 1 | 6 | 1 1 0 1 0 | 11 | 1 1 0 1 1 | 6 |
| 0 1 0 0 0 | 0 1 1 1 1 | 5' | 0 1 1 0 1 | 22 | 0 1 1 0 0 | 2 | 0 1 1 0 1 | 25 |
| 0 1 0 0 1 | 0 1 1 1 0 | 9' | 0 1 1 0 0 | 2 | 0 1 1 0 1 | 20 | 0 1 1 0 0 | 2 |
| 0 1 0 1 0 | 1 1 1 1 0 | 2 | 1 1 1 0 0 | 9 | 1 1 1 0 1 | 9 | 1 1 1 0 0 | 9 |
| 0 1 0 1 1 | 1 1 1 1 1 | 2' | 1 1 1 0 1 | 15 | 1 1 1 0 0 | 28 | 1 1 1 0 1 | 18 |
| 0 1 1 0 0 | 0 1 1 0 1 | 1'' | 0 1 1 1 1 | 3 | 0 1 1 1 0 | 3 | 0 1 1 1 1 | 3 |
| 0 1 1 0 1 | 0 1 1 0 0 | 2'' | 0 1 1 1 0 | 23 | 0 1 1 1 1 | 21 | 0 1 1 1 0 | 26 |
| 0 1 1 1 0 | 1 1 1 0 0 | 10' | 1 1 1 1 0 | 24 | 1 1 1 1 1 | 4 | 1 1 1 1 0 | 27 |
| 0 1 1 1 1 | 1 1 1 0 1 | 6' | 1 1 1 1 1 | 4 | 1 1 1 1 0 | 22 | 1 1 1 1 1 | 4 |
| 1 0 0 0 0 | 1 0 0 1 1 | 9 | 1 0 0 0 1 | 28 | 1 0 0 0 0 | L | 1 0 0 0 1 | 31 |
| 1 0 0 0 1 | 0 0 0 1 0 | 5 | 0 0 0 0 0 | 29 | 0 0 0 0 1 | 18 | 0 0 0 0 0 | 32 |
| 1 0 0 1 0 | 1 0 0 1 0 | L | 1 0 0 0 0 | 27 | 1 0 0 0 1 | 17 | 1 0 0 0 0 | 30 |
| 1 0 0 1 1 | 0 0 0 1 1 | 10 | 0 0 0 0 1 | 20 | 0 0 0 0 1 | 31 | 0 0 0 0 1 | 23 |
| 1 0 1 0 0 | 1 0 0 0 1 | 4 | 1 0 0 1 1 | 19 | 1 0 0 1 0 | 16 | 1 0 0 1 1 | 22 |
| 1 0 1 0 1 | 0 0 0 0 0 | 12' | 0 0 0 1 0 | 3' | 0 0 0 1 1 | 13 | 0 0 0 1 0 | 14 |
| 1 0 1 1 0 | 1 0 0 0 0 | 8 | 1 0 0 1 0 | 26 | 1 0 0 1 1 | 30 | 1 0 0 1 0 | 29 |
| 1 0 1 1 1 | 0 0 0 0 1 | 17 | 0 0 0 1 1 | 11 | 0 0 0 1 0 | 24 | 0 0 0 1 1 | 11 |
| 1 1 0 0 0 | 1 0 1 1 1 | 16 | 1 0 1 0 1 | 2' | 1 0 1 0 0 | 15 | 1 0 1 0 0 | 13 |
| 1 1 0 0 1 | 0 0 1 1 0 | 14 | 0 0 1 0 0 | 13 | 0 0 1 0 1 | 26 | 0 0 1 0 0 | 16 |
| 1 1 0 1 0 | 1 0 1 1 0 | 7 | 1 0 1 0 0 | 18 | 1 0 1 0 1 | 12 | 1 0 1 0 0 | 21 |
| 1 1 0 1 1 | 0 0 1 1 1 | 12 | 0 0 1 0 1 | 7 | 0 0 1 0 0 | 7 | 0 0 1 0 1 | 7 |
| 1 1 1 0 0 | 1 0 1 0 1 | 11' | 1 0 1 1 1 | 10 | 1 0 1 1 0 | 29 | 1 0 1 1 1 | 10 |
| 1 1 1 0 1 | 0 0 1 0 0 | 7' | 0 0 1 1 0 | 16 | 0 0 1 1 1 | 10 | 0 0 1 1 0 | 19 |
| 1 1 1 1 0 | 1 0 1 0 0 | 3 | 1 0 1 1 0 | 25 | 1 0 1 1 1 | 23 | 1 0 1 1 0 | 28 |
| 1 1 1 1 1 | 0 0 1 0 1 | 3' | 0 0 1 1 1 | 5 | 0 0 1 1 0 | 5 | 0 0 1 1 1 | 5 |

Figure 5:
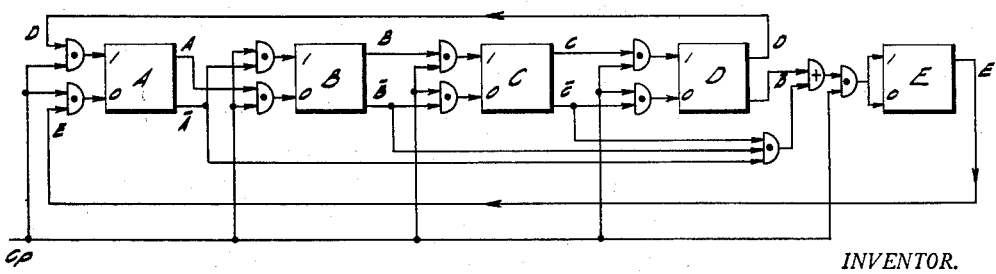
Fig. 5 is a schematic diagram of a scale-of-32 counter.

The scale-of-32 counter shown in Fig. 5 is mechanized according to transformation set 4, above. Since the mechanizations of several counters according to transformation functions have already been considered, it is believed that a detailed description of the circuit shown in Fig. 5 is unnecessary and is therefore omitted.

It has been explained above that many counting cycles may be obtained from a few basic counters according to the present invention by combining a first counter having a first counting cycle and a second counter having the first counting cycle or a second counting cycle. The second counting cycle may have no relationship to the first counting cycle. For example, a scale-of-10 counter is shown in Figure 2. As previously described, this scale-of-10 counter is obtained by combining a counter having a counting cycle of "5" and a counter having a counting cycle of "2." Another technique for obtaining a variety of cycles from a few counters of the type described above is to connect the counters into a chain or into "cascade." In this type of circuit each counter may be considered to be similar to the scale-of-2 counter in a binary chain. Whenever the counter is caused to complete its cycle and return to its initial stable state it produces a "carry" signal which is applied to the next counter in the chain.

If the counter which is to be connected in cascade includes a flip-flop which is only changed twice during its cycle the carry signals may be derived from one section of this flip-flop in the same manner as carry signals are derived in prior-art binary, "cascaded" counters. Thus, when the scale-of-3 and scale-of-5 counters described above are utilized in cascaded counter chains, carry signals may be derived from a single flip-flop of each counter, the particular flip-flop undergoing only two changes during a cycle. The counters utilized in chains must, of course, be preset so that the carry signals occur at the ends of the respective counting cycles.

The disadvantage of cascading counters due to the delay in propagating carry signals is considerably reduced when high-speed counters of the type described in this application and the copending applications are utilized.

since the desired counting cycle may be obtained by cascading only a few counters.

pending application and set 2 being defined according to the present invention:

(1)
$$Ca = Cp;\ Cb = A.Cp;\ Cc = A.B.Cp;\ Cd = A.B.C.Cp;\ Ce = A.B.C.D.Cp$$

(2)
$$\begin{array}{llll} 1A = D.Cp & 1B = \overline{A}.Cp & 1C = B.Cp & 1D = C.Cp \\ 0A = E.Cp & 0B = A.Cp & 0C = \overline{B}.Cp & 0D = \overline{C}.Cp \end{array};\ Ce = (\overline{D} + \overline{A}.\overline{B}.\overline{C}).Cp$$

It is apparent, then, that with a few basic types of counters it is possible to obtain a great number of cycles, by combining cycles, simultaneously operating counters, or by connecting counters into cascade. With five flip-flops, for example, it is possible to obtain any of the cycles 16 through 32; cycles of 19 and 23 being obtained by combining other cycles such as 17 and 2 for 19, cycles including odd and even factors having no common factor being obtained by simultaneously operating the corresponding counters, and cycles including two odd or two even factors being obtained by cascading the corresponding counters.

From the foregoing discussion, it should now be understood that counters having minimum gating circuits, may be mechanized according to the transformation function: $Cf = \overline{F}.G + F.H$, which may also be considered as defining the relationship: $F' = \overline{F}.G + F.\overline{H}$. Where it is also desired that function $Cf$ define a minimum load for the flip-flops in the counter, the only restriction which is added is that signals G and H must be different for each of the transformation functions in the defining set. This means that no flip-flop signal is used more than once, or that some flip-flop signals may not be utilized at all.

The scale-of-10 counter shown in Fig. 2 of this specification is one which includes all minimum gating circuits and provides a minimum loading for the flip-flops. It is interesting to compare the flip-flop loading of this counter with the scale-of-10 counter shown in the second copending application. The 10 counter of the copending application is defined by the functions:

$$Ca = Cp;\ Cb = A.\overline{D}.Cp;\ Cc = A.B.Cp;\ \begin{array}{l} 1D = A.B.C.Cp \\ 0D = A.Cp \end{array}$$

and the 10 counter of the present invention is defined by the functions:

$$\begin{array}{llll} 1A = Cp & 1B = Cp & 1C = Cp & \\ 0A = C.Cp & 0B = \overline{A}.Cp & 0C = B.Cp & Cd = Cp \end{array}$$

It will be noted that in the transformation functions defining the 10 counter of the copending application, signal A is utilized four times and signals B and C are utilized twice; whereas in the transformation functions defining the 10 counter of the present invention signals $\overline{A}$, B, and C are utilized only once. The section of flip-flop A in the 10 counter of the copending application, then, must support four times the load that is required for any of the sections of the flip-flops in the 10 counter of the present invention.

According to the definition of minimum gating circuits and minimum flip-flop loading adopted above, a counter which is obtained by combining two cycles in the above-described manner cannot have all minimum gating circuits and cannot have minimum flip-flop loading, since at least one gating circuit is responsive to more than one signal and at least one flip-flop signal is used twice. However, such a counter may provide much simpler gating and flip-flop loading than a similar counter of the type described in either the first or second copending application. For example, compare the scale-of-32 counters defined by function sets 1 and 2 below; set 1 being defined according to the principles set forth in the first co- In set 1 signal A is utilized four times; whereas in set 2 no signal is used more than twice, signals A, B, D, $\overline{D}$, and E being used only once.

While the principal object of the present invention is to provide minimum gating circuit flip-flop counters wherein the flip-flop load is well balanced and in some cases a minimum load; it is apparent that the invention is generic to all counters which may be obtained from the basic counters by combining cycles, simultaneously operating counters, or cascading counting stages.

Although only a relatively few species of the present invention have been shown in the figures and described throughout the specification, it is apparent that the principles herein developed may be extended to counters utilizing any number of flip-flops, for obtaining any cycle desired.

What is claimed is:

1. An N-stage electronic counter for producing count-representing signals corresponding to the number of previously-applied count pulses $Cp$ the stages in the counter having different combinations of operation to represent different values and having a number of combinations of operation greater than the number of stages in the counter, said electronic counter comprising: flip-flop designated as A, B . . . and N, each including a 1 and a 0 input circuit and producing complementary voltage-state signals designated as A, $\overline{A}$ and B, $\overline{B}$ . . . and N, $\overline{N}$, respectively; and transformation matrix means coupled to said input circuits and responsive to said voltage-state signals and to count pulses $Cp$ for producing control signals for actuating said flip-flops to change said complementary voltage-state signals according to a predetermined sequence, said transformation matrix means being connected to produce control signals for actuating the different flip-flops in accordance with transformation functions at least two of which are definable as $$Cf = (\overline{F}.G + F.H)Cp$$

Where F and $\overline{F}$ respectively represent true and false states of operation of one of the flip-flops in the counter and designated as the F flip-flop, where G and H represent voltages from flip-flops in the counter other than the F flip-flop, where $Cf$ represents a signal for triggering the F flip-flop from the true state of operation to the false state of operation or from the false state of operation to the true state of operation, where $Cp$ represents the clock signals, where the dot (.) represents an "and" relationship, and where the plus (+) sign represents an "or" relationship.

2. In an electronic counter for counting the number of applied count pulses designated as $Cp$ and indicating the count in the form of a binary-coded number, the combination comprising: flip-flops designated as A, B . . . and N, each including a 1 and a 0 input circuit and producing complementary voltage-state signals designated as A, $\overline{A}$ and B, $\overline{B}$ . . . and N, $\overline{N}$, respectively; and transformation matrix means coupled to said input circuits and responsive to said voltage-state signals and to said count pulses $Cp$ for producing pairs of control signals for introduction to the input circuits of the different flip-flops, the transformation matrix means being coupled to at least two pairs of said input circuits in accordance with the following functions for one of the pairs of input circuits $$1F = G.Cp$$
$$0F = H.Cp$$

where 1F and 0F respectively represent the introduction of input signals to the 1 and 0 input circuits of a flip-flop designated as the F flip-flop, where $Cp$ represents the pulses to be counted, where G and H respectively represent voltage-state output signals from flip-flops in the counter other than the F flip-flop, and where the dot (.) represents an "and" relationship.

3. In a flip-flop counter for counting the number of applied count pulses $Cp$, the combination comprising: N flip-flops, each including a 1 and a 0 input circuit and producing a pair of complementary output signals; and transformation matrix means coupled to said input circuits and responsive to said output signals and to said count pulses $Cp$ for producing pairs of control signals for actuating said flip-flops to change said output signals according to a predetermined sequence, said transformation matrix means including N pairs of gating circuits coupled to the input circuits of said N flip-flops, respectively, said gating circuits producing pairs of said control signals according to one of a plurality of transformation functions at least two of which are representable as $$Cf = (\bar{F}.G + F.H)Cp$$

where F and $\bar{F}$ represent the complementary output signals produced by one of the flip-flops to be controlled and designated as the F flip-flop, where each of G and H represents the output signals from only one flip-flop in the counter other than the F flip-flop, where $Cf$ represents the introduction of a control signal to the gating circuits of the F flip-flop, where $Cp$ represents the pulses to be counted, where the dot (.) represents an "and" relationship, and where the plus (+) sign represents an "or" relationship.

4. A multistage binary-coded counter for counting the number of applied count pulses $Cp$ the stages in the counter having different combinations of operation to represent different values and having a number of combinations of operation greater than the number of stages in the counter, comprising: a plurality of flip-flops, each including a pair of input circuits and producing a pair of complementary voltage-state signals; and matrix means coupled to said input circuits and responsive to said voltage-state signals and to said count pulses $Cp$ for producing pairs of control signals, one pair for each flip-flop, for actuating said flip-flops to change said complementary voltage-state signals according to a predetermined sequence, said matrix means including a plurality of pairs of gating circuits coupled to the input circuits of said flip-flops, respectively, each of said gating circuits applying a control signal to one input circuit of the associated flip-flop and being mechanized for control by a maximum of only one of the voltage-state signals other than the flip-flop receiving the signals from the gating circuit.

5. In an electronic counter for counting the number of applied count pulses designated as $Cp$ and indicating the count in the form of a binary-coded number, the combination comprising: a plurality of flip-flops designated as A, B, . . . and N, each including a 1 and a 0 input circuit and producing complementary voltage-state signals designated as A, $\bar{A}$ and B, $\bar{B}$, . . . and N, $\bar{N}$, respectively; and transformation matrix means coupled to said input circuits and responsive to said voltage-state signals and to said count pulses $Cp$ for producing control signals for application to each flip-flop in accordance with the changing transformation function $$Cf = (\bar{F}.G + F.H)Cp$$

where F and $\bar{F}$ represent the complementary voltage-state signals produced by one of the flip-flops in the counter designated as the F flip-flop, where G and H represent voltage-state signals produced by other flip-flops in the counter than the F flip-flop, . . . where $Cf$ represents signals passing through the transformation matrix means to the input circuits of the F flip-flop, where $Cp$ represents the pulses to be counted, where the dot (.) represents an "and" relationship, and where the plus (+) sign represents an "or" relationship.

6. A binary-coded, scale-of-10 counter comprising: four flip-flops, each including a 1 and a 0 input circuit and producing a pair of complementary output signals; and transformation matrix means coupled to said input circuits and responsive to said output signals and to applied count pulses for producing control signals for actuating said flip-flops to produce distinctive patterns of operation of the flip-flops for an individual count of the pulses between "1" and "10", said transformation matrix means including eight gating circuits coupled to said input circuits, respectively, each of said gating circuits applying a control signal to the associated flip-flop input circuit in accordance with an output voltage from a different one of the flip-flops in the counter other than the associated flip-flop for the application of each output voltage from the different flip-flops to at most only one of the gating circuits.

7. The binary-coded, scale-of-10 counter defined in claim 6, in which five gating circuits apply signals to the associated flip-flop input circuits upon only the occurrence of count pulses and the other three gating circuits are "and" networks each receiving the count pulses and the output signals from one of the flip-flops other than the flip-flop associated with the gating circuit.

8. The binary-coded, scale-of-10 counted defined in claim 6 wherein the four flip-flops are designated as A, B, C and D; wherein the pairs of complementary output signals from the A, B, C and D flip-flops are respectively designated as A and $\bar{A}$, B and $\bar{B}$, C and $\bar{C}$ and D and $\bar{D}$; and wherein the eight gating circuits are mechanized as $$1A = Cp \quad 1B = Cp \quad 1C = Cp \quad 1D = Cp$$

$$0A = C.Cp \quad 0B = \bar{A}.Cp \quad 0C = B.Cp \quad 0D = Cp$$

where 1A, 1B, 1C and 1D respectively represent the introduction of control signals to the 1 input circuits of the A, B, C and D flip-flops, where 0A, 0B, 0C and 0D respectively represent the introduction of control signals to the 0 input circuits of the A, B, C and D flip-flops, where $Cp$ represents the pulses to be counted, and where the dot (.) represents an "and" relationship.

9. A binary-coded, scale-of-8 counter comprising: three flip-flops A, B, and C, producing pairs of complementary output signals A, $\bar{A}$; B, $\bar{B}$; and C, $\bar{C}$; respectively, each flip-flop including a 1 and a 0 input circuit; and transformation matrix means coupled to said input circuits and responsive to said output signals and to applied count pulses $Cp$ for producing three corresponding pairs of control signals for actuating said flip-flops to change said output signals according to a scale-of-8 sequence, one pair of said control signals being applied to the 1 and 0 input circuits, respectively, of each of flip-flops A, B, and C, said pairs of control signals being defined, respectively, by the transformation functions:

$$1A = B.Cp \quad 1B = A.Cp$$
$$\quad ; \quad\quad\quad ; \quad Cc = \bar{B}.Cp$$
$$0A = C.Cp \quad 0B = A.Cp$$

where 1A and 1B respectively represent the introduction of control signals to the 1 input circuits of the A and B flip-flops, where 0A and 0B respectively represent the introduction of control signals to the 0 input circuits of the A and B flip-flops, where $Cc$ represents signals introduced to flip-flop C and where the dot (.) represents an "and" relationship.

10. A binary-coded, scale-of-5 counter comprising: three flip-flops designated as A, B, and C, producing pairs of complementary output signals designated as A, $\overline{A}$; B, $\overline{B}$; and C, $\overline{C}$; respectively, each flip-flop including a 1 and a 0 input circuit; and transformation matrix means coupled to said input circuits and responsive to said output signals and to applied count pulses designated as $Cp$ for producing three pairs of control signals for actuating said flip-flops to produce distinctive patterns of operation of the flip-flops for an individual count of the count pulses between "1" and "5" in accordance with the transformation functions:

$$1A = Cp \quad 1B = Cp \quad 1C = Cp$$
$$0A = C.Cp \quad 0B = \overline{A}.Cp \quad 0C = B.Cp$$

where 1A, 1B and 1C respectively represent the introduction of control signals to the 1 input circuits of the A, B and C flip-flops, where 0A, 0B and 0C respectively represent the introduction of control signals to the 0 input circuits of the A, B and C flip-flops, and where the dot (.) represents an "and" relationship.

11. A binary-coded, scale-of-16 counter comprising: four flip-flops A, B, C, and D, producing pairs of complementary output signals A, $\overline{A}$; B, $\overline{B}$; C, $\overline{C}$; and D, $\overline{D}$; respectively, each flip-flop including a 1 and a 0 input circuit; and transformation matrix means coupled to said input circuits and responsive to said output signals and to applied count pulses $Cp$ for producing four corresponding pairs of control signals for actuating said flip-flops to change said output signals according to a scale-of-16 sequence, one pair of said control signals being applied to the 1 and 0 input circuits, respectively, of each of flip-flops A, B, C, and D, said pairs of control signals being defined, respectively, by the transformation functions:

$$1A = C.Cp \quad 1B = A.Cp$$
$$0A = D.Cp \quad 0B = \overline{A}.Cp \quad ; Cc = \overline{B}.Cp; \ Cd = (B + \overline{A}.\overline{C}).Cp$$

where 1A and 1B respectively represent control signals introduced to the 1 input circuits of the A and B flip-flops, where 0A and 0B respectively represent control signals introduced to the 0 input circuits of the A and B flip-flops, where $Cc$ represents signals introduced to the input circuits of the C flip-flop, where $Cd$ represents signals introduced to the input circuits of the D flip-flop, where the dot (.) represents an "and" relationship, and where the plus (+) sign represents an "or" relationship.

12. A binary-coded, scale-of-32 counter comprising: five flip-flops A, B, C, D, and E, producing pairs of complementary output signals A, $\overline{A}$; B, $\overline{B}$; C, $\overline{C}$; D, $\overline{D}$; and E, $\overline{E}$; respectively, each flip-flop including a 1 and a 0 input circuit; and transformation matrix means coupled to said input circuits and responsive to said output signals and to applied count pulses $Cp$ for producing five corresponding pairs of control signals for actuating said flip-flops to change said output signals according to a scale-of-32 sequence, one pair of said control signals being applied to the 1 and 0 input circuits, respectively, of each of flip-flops A, B, C, D, and E, said pairs of control signals being defined, respectively, by the transformation functions:

$$1A = D.Cp \quad 1B = \overline{A}.Cp \quad 1C = B.Cp \quad 1D = C.Cp$$
$$0A = E.Cp \quad 0B = A.Cp \quad 0C = \overline{B}.Cp \quad 0D = \overline{C}.Cp \quad ; Ce = (\overline{D} + \overline{A}.\overline{B}.\overline{C}).Cp$$

where 1A, 1B, 1C and 1D respectively represent signals introduced to the 1 input circuits of the A, B, C and D flip-flops, where 0A, 0B, 0C and 0D respectively represent signals introduced to the 0 input circuits of the A, B, C and D flip-flops, where $Ce$ represents signals introduced to the input circuits of the E flip-flop, where the dot (.) represents an "and" relationship, and where the plus (+) sign represents an "or" relationship.

References Cited in the file of this patent

UNITED STATES PATENTS

| | | |
|---|---|---|
| 2,536,955 | Palmer et al. | Jan. 2, 1951 |
| 2,584,363 | Mumma | Feb. 5, 1952 |
| 2,630,969 | Schmidt | Mar. 10, 1953 |
| 2,715,678 | Barney | Aug. 16, 1955 |
| 2,719,670 | Jacobs et al. | Oct. 4, 1955 |
| 2,758,788 | Yeager | Aug. 14, 1956 |
| 2,764,343 | Diener | Sept. 25, 1956 |

OTHER REFERENCES

The Physical Realization of an Electronic Digital Computer, by A. D. Booth, Electronic Engineering (British), December 1950, pages 492–496.

UNITED STATES PATENT OFFICE
CERTIFICATE OF CORRECTION

September 23, 1958

Patent No. 2,853,238

Robert Royce Johnson

It is hereby certified that error appears in the printed specification of the above numbered patent requiring correction and that the said Letters Patent should read as corrected below.

Column 4, line 64, for that portion of the equation reading "F" read -- $\bar{F}$ --; column 6, line 6, for that portion of the equation reading "SfO" read -- $\overline{SfO}$ --; column 11, line 50, for that portion of the equation reading "1B=A.Cp" read -- 1B=$\bar{A}$.Cp --.

Signed and sealed this 27th day of January 1959.

(SEAL)

Attest:

KARL H. AXLINE

Attesting Officer

ROBERT C. WATSON
Commissioner of Patents